(12) United States Patent
Baratin et al.

(10) Patent No.: US 7,121,046 B2
(45) Date of Patent: Oct. 17, 2006

(54) SEALING GASKET FOR MOUNTING AROUND A MOTOR VEHICLE DOOR THAT PRESENTS AT LEAST ONE CORNER HAVING A SMALL RADIUS OF CURVATURE

(75) Inventors: Sylvain Baratin, Vieilles Maisons (FR); Bertrand Florentz, Paucourt (FR)

(73) Assignee: Hutchinson, Paris (FR)

( * ) Notice: Subject to any disclaimer, the term of this patent is extended or adjusted under 35 U.S.C. 154(b) by 266 days.

(21) Appl. No.: 10/820,041

(22) Filed: Apr. 8, 2004

(65) Prior Publication Data

US 2004/0255520 A1  Dec. 23, 2004

(30) Foreign Application Priority Data

Apr. 11, 2003 (FR) ................................. 03 04543

(51) Int. Cl.
*E06B 7/16* (2006.01)
*B60J 10/08* (2006.01)

(52) U.S. Cl. ............... 49/479.1; 49/475.1; 296/146.9; 277/921

(58) Field of Classification Search ............ 49/475.1, 49/483.1, 498.1, 479.1, 495.1; 296/146.2, 296/146.9; 277/921, 642, 645, 637; 264/250, 264/255, 259, 201; 52/716.5; 428/36.9, 428/122

See application file for complete search history.

(56) References Cited

U.S. PATENT DOCUMENTS

| | | | |
|---|---|---|---|
| 4,617,220 A * | 10/1986 | Ginster | 428/122 |
| 5,527,583 A * | 6/1996 | Nozaki et al. | 428/99 |
| 5,715,632 A | 2/1998 | Nozaki | |
| 6,112,469 A * | 9/2000 | Vuillemot et al. | 49/498.1 |
| 6,138,415 A * | 10/2000 | Ohtsu et al. | 49/490.1 |
| 6,250,018 B1 * | 6/2001 | Kawai et al. | 49/479.1 |
| 6,393,766 B1 * | 5/2002 | Nozaki et al. | 49/498.1 |
| 6,405,489 B1 * | 6/2002 | Miura | 49/479.1 |
| 6,539,671 B1 * | 4/2003 | Yamaguchi et al. | 49/498.1 |
| 6,739,094 B1 * | 5/2004 | Berry et al. | 49/478.1 |
| 6,777,068 B1 * | 8/2004 | Teramoto et al. | 428/318.6 |
| 6,896,268 B1 * | 5/2005 | Hofmann et al. | 277/317 |
| 2002/0026751 A1 | 3/2002 | Kawai et al. | |

FOREIGN PATENT DOCUMENTS

| | | |
|---|---|---|
| DE | 4441852 A1 | 11/1994 |
| DE | 10043136 A1 | 8/2000 |
| EP | 0794079 A1 | 9/1997 |

\* cited by examiner

*Primary Examiner*—Hugh B. Thompson, II
(74) *Attorney, Agent, or Firm*—Clark & Brody

(57) ABSTRACT

A sealing gasket for mounting around a motor vehicle door presenting at least one corner of small radius of curvature, the gasket being mounted directly on its support without being subjected to any specific localized treatment operation in a support corner of small radius of curvature, and comprising at least a flexible or semi-rigid fixing portion fixed by adhesive to its support and an elastically-deformable tubular portion for providing sealing, wherein the elastically-deformable portion of the gasket is given a shape extending from its fixing portion that is generally triangular, being defined by two lateral pillars which between them form an angle of about 10° to 80°, and which are united by an arch, said angle being defined using two straight lines passing substantially through the middles of the two lateral pillars at $\tfrac{2}{5}$ths and at $\tfrac{4}{5}$ths of the total height of the gasket measured from its fixing portion.

12 Claims, 4 Drawing Sheets

SEALING GASKET FOR MOUNTING AROUND A MOTOR VEHICLE DOOR THAT PRESENTS AT LEAST ONE CORNER HAVING A SMALL RADIUS OF CURVATURE

The invention relates to a sealing gasket for mounting on a motor vehicle door presenting at least one corner with a small radius of curvature.

BACKGROUND OF THE INVENTION

Such a sealing gasket comprises in particular at least two portions: a rigid or semi-rigid first portion for fixing on a support; and a flexible and deformable second portion for providing sealing. At present, the sealing gaskets which are used to provide sealing between the body and the doors of a motor vehicle, for example, are positioned either on the body or else on the doors themselves. When the gaskets are positioned on vehicle doors, they are held in place by clips that are secured to the fixing portion of the gasket by means of a fixing rail mounted on the door, or by an adhesive secured to the fixing portion of the gasket, it being understood that adhesive provides the best compromise between cost, weight, and performance, The second portion of such a gasket that provides the sealing may be tubular in shape, thus making it very tolerant in terms of door-closure energy, but not very strong in the corners of the door. To mitigate that drawback, door gaskets are generally subjected to a thermoforming operation so as to limit the extent to which they collapse in door corners of small radius of curvature.

In general, adhesive gaskets on a door are mounted on their supports by hand or by automatic systems of the static type. Such gaskets are generally delivered in looped form and are also subjected to a thermoforming operation prior to being mounted on doors. The thermoforming operation serves to compensate for gasket collapse in door corners that present a small radius of curvature.

At present, technology makes it possible to envisage putting such gaskets into place by means of robotic systems of the dynamic type. Under such circumstances, it is preferable for the gasket not to be looped in a ring, so that it can be guided continuously by the gasket-laying head of the robotic system.

Under such conditions, it is desirable to envisage supplying such gaskets in long lengths, with the gaskets being, for example, initially stored on a drum, on a pallet, or in a container.

Supplying gaskets in this way presents numerous advantages, and particular mention can be made of the following:
  reducing the cycle time required to put the gasket into place;
  eliminating human intervention for loading a gasket on each cycle;
  considerably reducing the number of packages since a single drum can replace tens of cardboard boxes containing looped gaskets;
  reducing waste and pollution;
  reducing the number of references, since at present gaskets are specific to each type of door; and
  eliminating the operation of bonding a handling tongue placed on the adhesive for each gasket, if the gasket is of the type using adhesive.

In spite of the above advantages, such a solution still leaves in suspension the problem of the localized thermoforming operations performed on such gaskets at door corners of small radius of curvature, it being understood that the gaskets are wound onto drums carrying long lengths of gasket.

OBJECTS AND SUMMARY OF THE INVENTION

A particular object of the invention is to find a novel gasket which is suitable for simplifying the operations of mounting a gasket, in particular for avoiding any operation involving treatment specific to a corner of small radius of curvature on the receiving structure, the novel gasket being suitable in particular for being put into place by a robotic system of dynamic type.

To this end, the invention proposes a sealing gasket for mounting on a support presenting at least one corner of small radius of curvature, the gasket comprising at least a flexible or semi-rigid fixing portion fixed to its support by means of an adhesive, and an elastically-deformable tubular portion for providing sealing, in which gasket the elastically-deformable portion thereof, i.e. starting from its fixing portion, is given a shape that is generally triangular, being defined by two pillars united with each other by an arch, the pillars forming between each other in right section an angle lying in the range 10° to 80°, and advantageously an angle of about 30°, this angle being defined by two straight lines passing substantially through the middles of the two pillars at ⅔ths and at ⅘ths of the total height of the gasket starting from the fixing portion thereof.

Thus, a gasket of the invention will lose height of no more than 2.5 millimeters (mm) in a corner of small radius of curvature of the support.

Furthermore, after the gasket has been mounted on its support, the elastically-deformable portion is such that in a corner of small angle of radius of the support its right section is subjected to deformation which projects outwards by no more than about 2 mm beside the contact zone between the gasket and the body, compared with the extent to which the gasket extends when in the free state.

A gasket of the invention presents the advantage of being suitable for being mounted directly on a motor vehicle door without needing to be subjected to any localized special treatment operation, and in particular any thermoforming in door corners of small radius of curvature, thereby reducing its manufacturing cost, while conferring improved properties to the gasket.

According to an advantage of the gasket of the invention, the shape which is given to it is such that the flattening of its elastically-deformable portion is controlled so that it retains overall the same shape, thereby giving it good sealing properties in zones having a small radius of curvature and a small angle.

BRIEF DESCRIPTION OF THE DRAWINGS

Other advantages, characteristics, and details of the invention appear from the following additional description made with reference to the accompanying drawings, which are given purely by way of example, and in which.

MORE DETAILED DESCRIPTION

Figure 1:
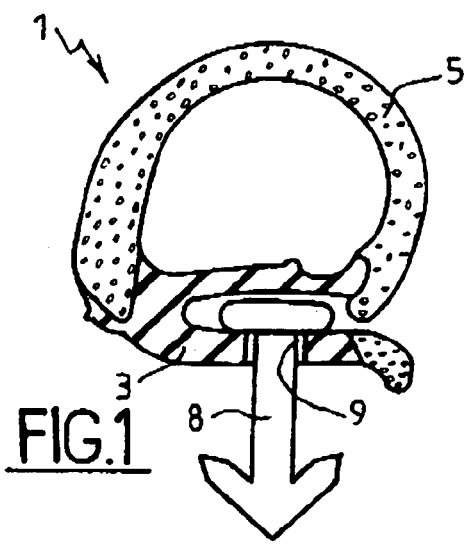
FIGS. 1 and 2 are two section views of two prior art sealing gaskets mentioned in the introduction.
Figure 2:
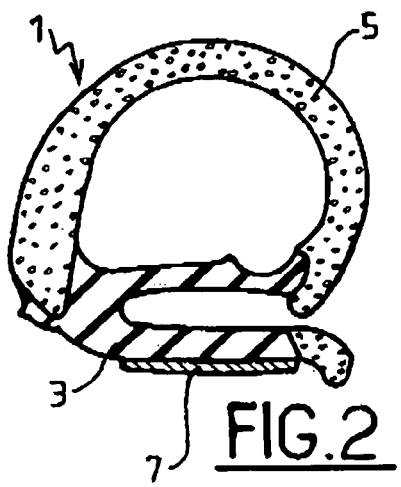

The sealing gaskets 1 as shown in FIGS. 1 and 2 represent the prior art mentioned in the introduction. Such gaskets 1 are intended in particular to provide sealing on a motor vehicle door, and comprise at least a flexible or semi-rigid fixing portion 3 and an elastically-deformable portion 5 which may be tubular in shape. Such gaskets are manufactured by extruding or co-extruding elastomer and/or plastomer materials, and the fixing portion 3 of the gasket may include an adhesive 7 for fixing the gasket to its support.

The sealing gasket of FIG. 1 has its fixing portion 3 supporting clips or pegs 8 that are engaged in openings 9 through the fixing portion 3. In contrast, the sealing gasket 1 in FIG. 2 has a strip of double-sided adhesive 7 fitted onto the outside face of its fixing portion.

In the invention, the gasket 10 presents an elastically-deformable tubular portion 5 of a shape such as to avoid any need for a local thermoforming operation on the gasket, in particular in a zone of the support that receives it presenting at least one corner with a small radius of curvature. In general, the term "support having a corner with a small radius of curvature" should be understood as a corner forming an angle of not more than 80° over a radius of curvature of not more than 80 mm, it being understood that this definition does not constitute any kind of limitation on the present invention.

Figure 3:
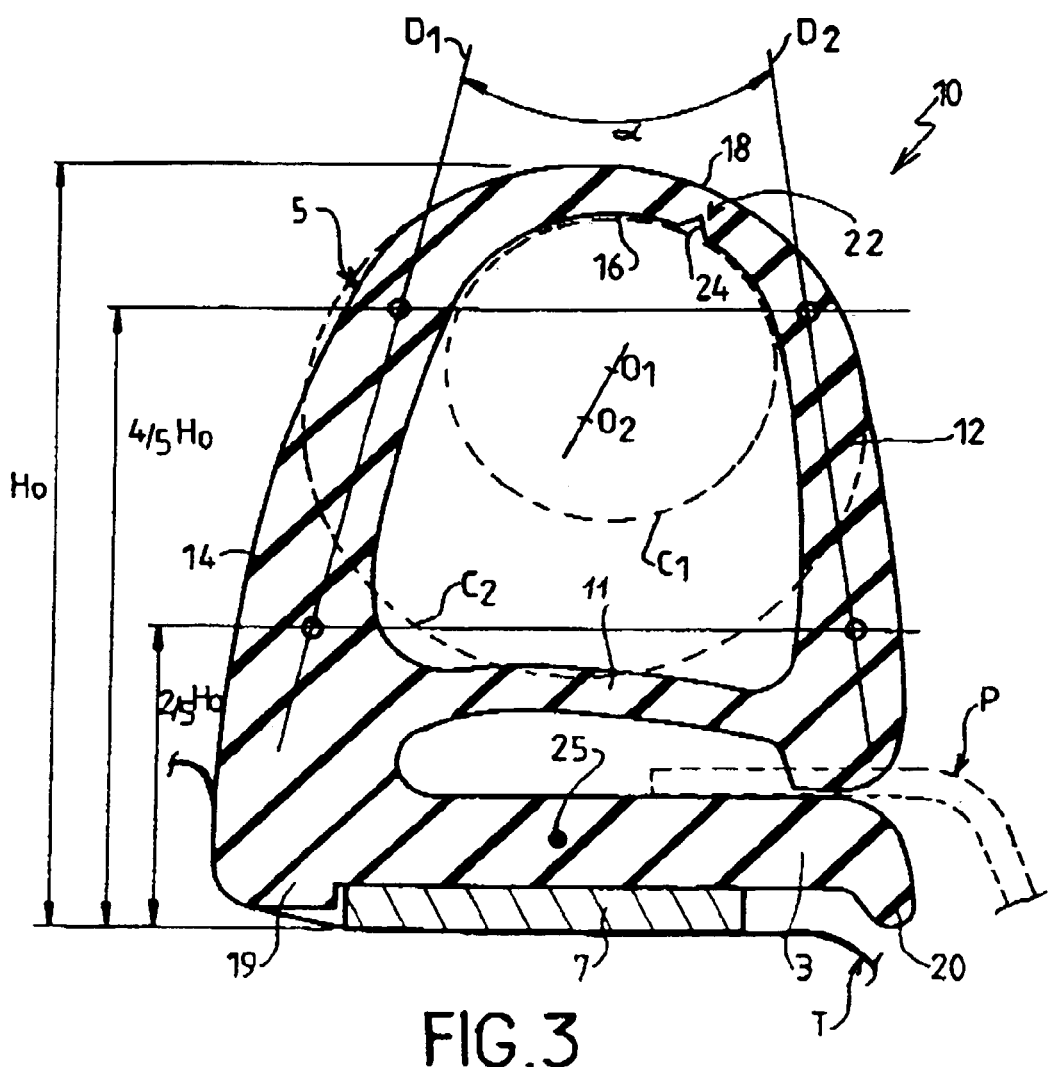
FIG. 3 is a section view of a sealing gasket of the invention.

A gasket 10 of the invention is shown in FIG. 3, its elastically-deformable tubular portion 5 presenting in particular a triangular or trapezoidal shape in right section with two pillars 12 and 14 rising from the fixing portion 3 of the gasket 10. These two pillars 12 and 14 slope slightly towards each other and they are united with each other by a semi-circular arch portion. The arch effect is particularly advantageous since the pillars 12 and 14 will tend to move towards each other in the event of the elastically-deformable portion 5 being deformed, whereas in prior art gaskets, these two pillars tend, on the contrary, to move away from each other.

Nevertheless, the extent to which the two pillars 12 and 14 of the elastically-deformable portion 5 of the gasket 10 can move towards each other is limited by the arch, thus providing a gasket 10 that is very stable, and that is of a shape that varies little, with limited loss of height when it is mounted on a door corner having a small radius of curvature, as explained below.

In the example shown in FIG. 3, the elastically-deformable portion 5 includes a base portion 11 which extends parallel to the fixing portion 3 of the gasket 10, being connected thereto at one end in order to avoid any permanent stress on the adhesive 7 and in order to improve the closure energy of the door.

The two pillars 12 and 14 of mean thickness of about 2.5 mm do not extend parallel to each other, but form an angle α which generally lies in the range 10° to 80°, and advantageously is about 30°, and the inner and outer top portions 16 and 18 of the arch lie generally on two circles $C_1$ and $C_2$ of centers $O_1$ and $O_2$ that are spaced apart from each other by a distance of more than 0.7 mm.

More precisely, the angle α, which is formed between the two pillars 12 and 14 of the elastically-deformable portion 5 of the gasket 10, is defined overall by two straight lines $D_1$ and $D_2$ passing through points at ⅖ths and at ⅘ths of the total height $H_1$ of the gasket 10 starting from its fixing portion 3.

The sealing gasket 10 can be fixed by any suitable means to the support that receives it, and in particular by means of a strip of adhesive 7 applied to its fixing portion 3, it being understood that the elastically-deformable portion 5 of the pillar 14 is situated beside the door frame, whereas the pillar 12 is deformed by the zone of contact between the gasket and the body.

Figure 4:
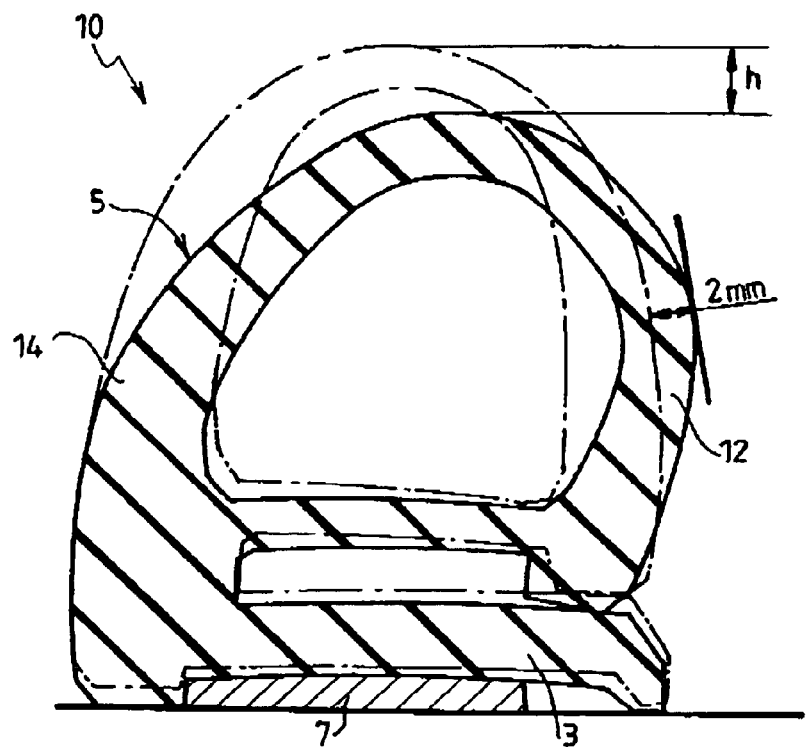
FIG. 4 is a section view-of the FIG. 3 sealing gasket in the deformed state.
Figure 5:
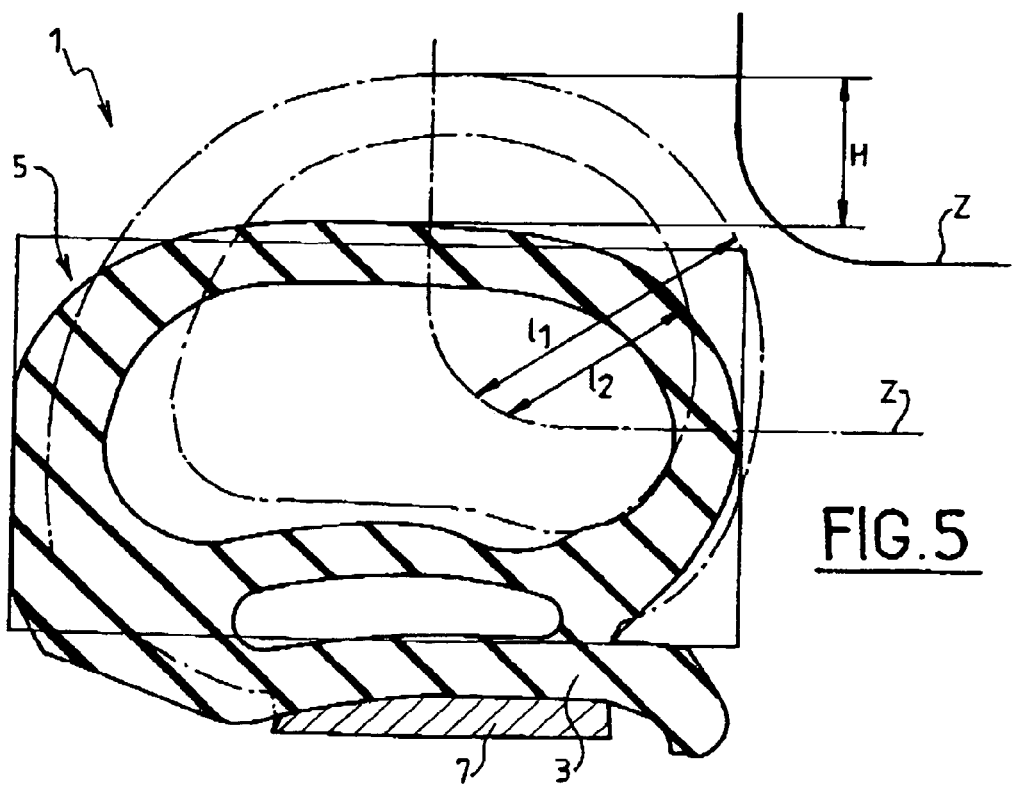
FIG. 5 is a section view of a prior art sealing gasket in the deformed state.

With such a sealing gasket 10 mounted in a door corner of small radius of curvature, for example as shown in FIG. 4, it can be seen that the loss of height h of the gasket 10 is not more than 2.5 mm. The gasket 10 deforms in such a manner that its right cross-section projects outwards a little by about 2 mm at most beside the pillar 12 facing the zone of contact between the gasket and the body, and relative to the right cross-section of the gasket when in the free state. In contrast, with a prior art gasket 1 as shown in FIG. 5, the loss of height H of the gasket is considerably greater and its deformation is such that its right section is flattened to a much greater extent relative to the section of the gasket 1 in the free state as drawn in chain-dotted lines. That is why it is necessary to perform specific treatment to the prior art gasket 1, e.g. a thermoforming operation, in order specifically to reduce this loss of height H.

Furthermore, it is well known for certain vehicles that when the door sealing gasket is in place on a door, it can mask the edge of a panel lining the door. Under such circumstances, and as shown in dashed lines in FIG. 3, the end of the lining panel P can be received adjacent to the pillar 12 of the gasket 10 between the base 11 of the elastically-deformable portion 5 of the gasket and its fixing portion 3. The elastically-deformable portion of the gasket is thus raised by the lining panel P, thus having the effect of producing a loss of height h that is regular for the gasket 10 in a door corner having a small radius of curvature, and obtaining deformation in the right cross-section of the gasket 10 that occupies the right section of the gasket in the free state even better. In addition, the sheet metal T constituting the gasket support 10 may form a shoulder beside the pillar 14 that serves as a lateral abutment for the elastically-deformable portion 5 of the gasket 10 so as to prevent it from tilting in the wrong direction.

The fixing portion 3 of the gasket, also known as its "sole plate" can also present bearing portions 19 and 20 of extra thickness (see FIG. 3), substantially on either side of the adhesive 7 in order to limit the loss of height h of the gasket in a corner of the support that presents a small radius of curvature.

Advantageously, means 22 can be added to weaken the compressibility forces of the gasket 10, these means 22 being constituted, for example, by at least one hinge-forming line of weakness 24 formed in the inside wall 16 of the elastically-deformable portion 5 of the gasket, e.g. in its arch, in particular (FIG. 3).

In general, the pillars 12 and 14 of the gasket 10 can be asymmetrical, for example having a pillar 14 that is of greater thickness for improving sound damping and retention of the gasket 10 in zones of the support receiving it that have a small radius of curvature, and a pillar 12 of smaller thickness in order to reduce the compressibility forces of the gasket. Furthermore, in order to limit the loss of height h of the gasket and in order to limit compression of its elastically-deformable portion 5, as shown in particular in FIG. 6, the pillar 14 may be made at least in part out of an elastically-deformable material that is flexible, semi-rigid, or rigid. Finally, the pillars 12 and 14 in the base portion 11 formed by the elastically-deformable portion 5 of the gasket 10 may be of greater thickness in order to constitute a kind of beam for supporting the gasket 10.

In addition, the arch-shaped portion uniting the two pillars 12 and 14 of the elastically-deformable gasket 5 of the gasket 10 and forming the sealing zone of said gasket presents a width in right section that is smaller than the width of a prior art gasket. This results in greater flexibility in the positioning of the gasket on the support that receives it, which is particularly advantageous when the gasket is put into place by a robot suitable for enabling changes in the path followed by the gasket.

Figure 6:
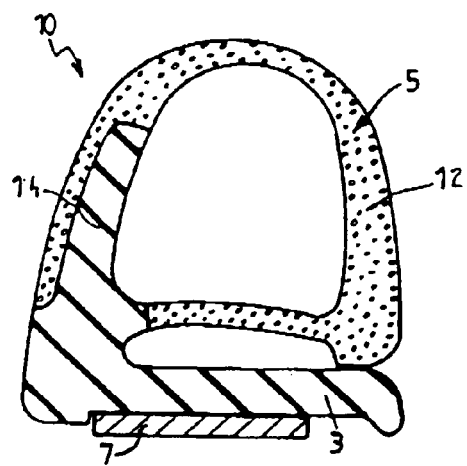
FIG. 6 is a section view of another embodiment of a sealing gasket of the invention.
Figure 7:
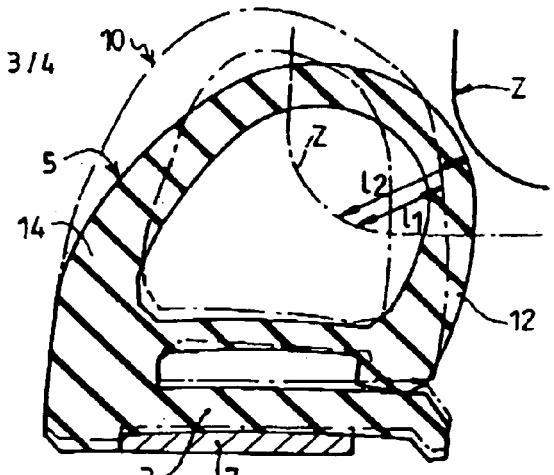
FIG. 7 is a section view of the FIG. 6 sealing gasket in a corner having a small radius of curvature.

FIG. 7 shows the gasket 10 of FIG. 6 in the state that it occupies in a corner of small radius of curvature, and it can be seen that the distance $l_2$ which corresponds to the interference between the gasket 10 and the zone Z of the vehicle body is increased compared with the distance $l_1$ in the non-deformed state of the gasket 10, whereas in the prior art as shown in FIG. 5, the distance $l_2$ is decreased relative to the interference $l_1$ in the non-deformed state of the gasket.

Figure 8:
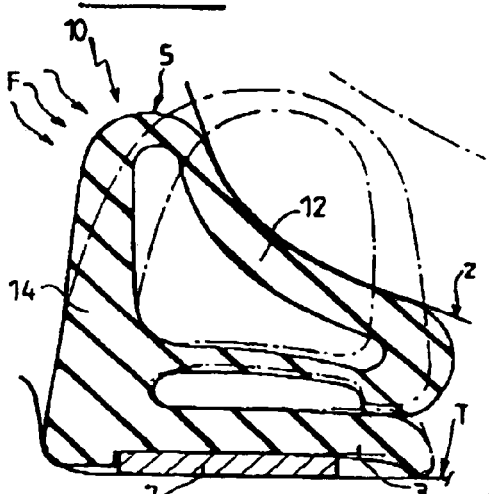
FIG. 8 is a section view of the FIG. 7 gasket mounted on a door and shown in its state deformed by the door body zone.

FIG. 8 shows the gasket 10 mounted on a door and in its state where it is deformed by the body zone Z when the door is closed,. the thicker pillar 14 serving better to stop soundwaves represented by arrows F, the pillar 14 pressing, for example, against a shoulder constituted by the sheet metal T of the door.

Figure 9:
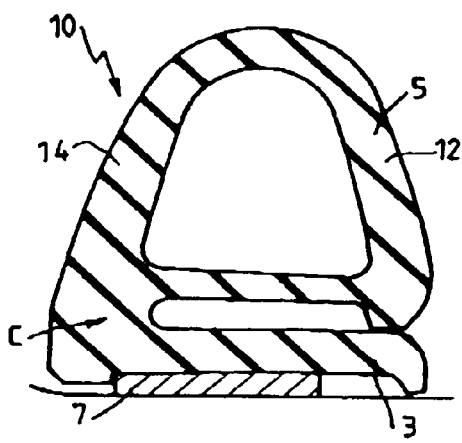
FIG. 9 is a section view of another embodiment of a sealing gasket of the invention.

In FIG. 9, there can be seen another embodiment of the invention in which the two pillars 12 and 14 are closer together so as to give the elastically-deformable portion of the gasket 10 a shape that is more triangular than in the preceding embodiments.

Figure 10:
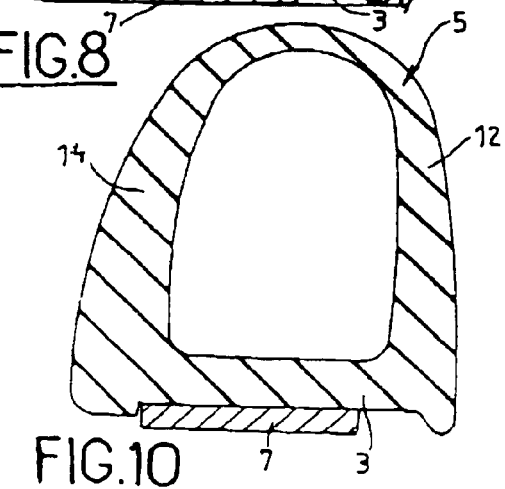
FIGS. 10 and 11 are section views of two other embodiments of a sealing gasket of the invention.
Figure 11:
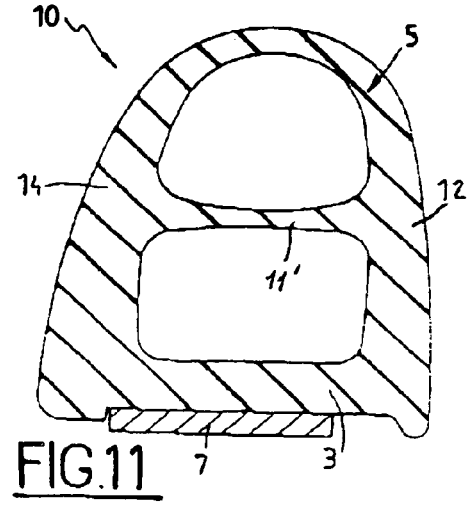

In FIGS. 10 and 11, two other sealing gaskets 10 of the invention are shown. In the gasket of FIG. 10, the two pillars 12 and 14 of the elastically-deformable portion 5 are directly connected to the fixing base 3 of the gasket 10, whereas FIG. 11 is of the same configuration as FIG. 6 except that the elastically-deformable portion 5 is constituted by two tubes with an intermediate partition 11'.

In general, one end of the gasket 10 may include one or more reinforcing threads 25 in its fixing portion 3 (see FIG. 3) and also one or more strips, making the gasket easier to extrude, and above all making it easier to put into place by means of a dynamic system robot. These threads serve to limit the extent to which the gasket can lengthen while it is being put into place on its support.

Figure 12:
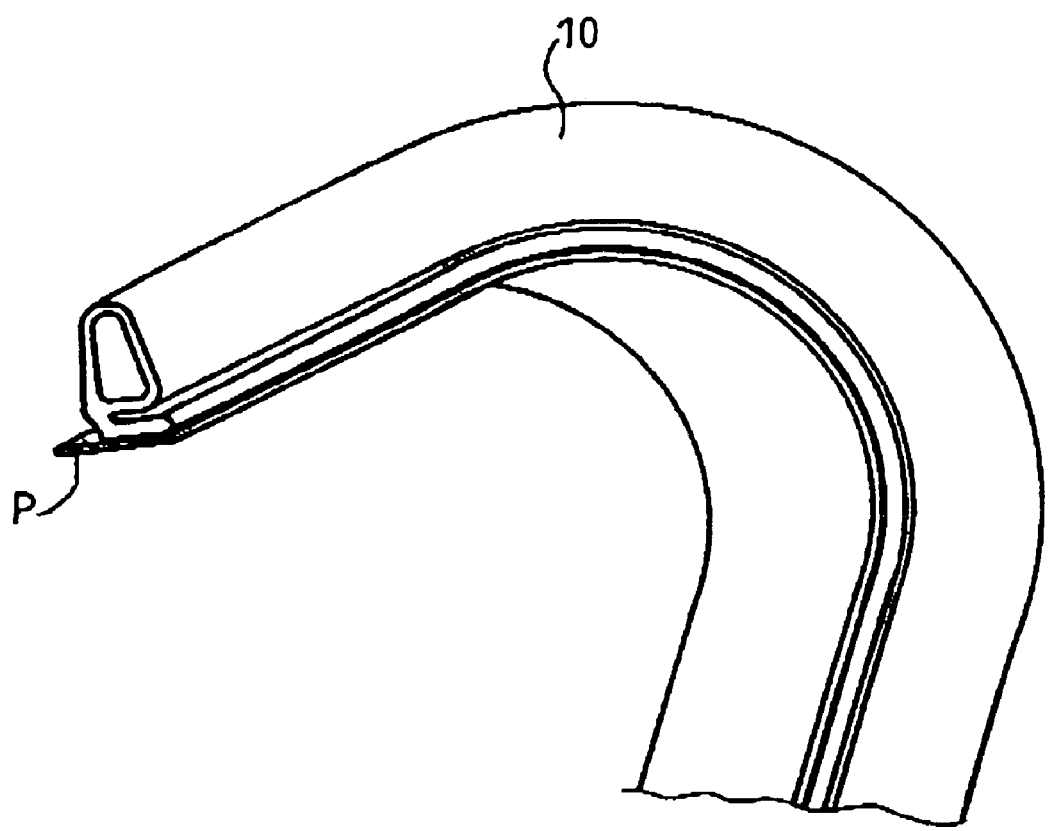
FIG. 12 is a fragmentary perspective view of a gasket of the invention mounted in a zone of the support that receives it that presents a corner having a small radius of curvature.

Finally, FIG. 12 is a perspective view of a sealing gasket 10 mounted on a support for receiving it such as a door P in a zone of the support that presents a corner having a small radius of curvature.

A sealing gasket of the invention can be mounted on any door, trunk, or hood of a motor vehicle in manual, semi-automatic or automatic manner, it being understood that the vehicle may equally well be a car, a utility vehicle, a truck, or bus, a train, an airplane, . . .

What is claimed is:

1. A sealing gasket for mounting around a motor vehicle door presenting at least one corner of small radius of curvature, the gasket being mounted directly on its support without being subjected to any specific localized treatment operation in a support corner of small radius of curvature, and comprising at least a flexible or semi-rigid fixing portion fixed by adhesive to its support and an elastically-deformable tubular portion for providing sealing, wherein the elastically-deformable portion of the gasket is given a shape extending from its fixing portion that is generally triangular, being defined by two lateral pillars which between them form an angle of about 10° to 80°, and which are united by an arch, said angle being defined using two straight lines passing substantially through the middles of the two lateral pillars at ⅖ ths and at ⅘ ths of the total height of the gasket measured from its fixing portion, the gasket having a uniform cross section along its length.

2. A sealing gasket according to claim 1, in which, once the gasket has been mounted on its support, the elastically-deformable portion is such that in said corner of small radius of curvature, its right section is subjected to deformation causing it to project outwards by a maximum of about 2 mm beside the zone of contact between the gasket and the body and relative to the position of the gasket in the free state.

3. A sealing gasket according to claim 1, in which the angle between the two lateral pillars of the elastically-deformable portion of the gasket is about 30°.

4. A sealing gasket according to claim 1, in which inner and outer top portions of the arch of the elastically-deformable portion are generally situated on two circles having centers that are spaced apart from each other by a distance of more than 0.7 mm.

5. A door containing the sealing gasket according to claim 1, in which a loss of gasket height is obtained in a corner of small radius of curvature of the support that is no greater than 2.5 mm when the gasket is mounted on the door presenting a radius of curvature that is less than or equal to 80 mm and extending over an angle that is less than or equal to 80°.

6. A sealing gasket according to claim 1, in which the shape of the arch interconnecting the two pillars of the elastically-deformable portion of the gasket is such that a zone which provides sealing presents, in right cross-section, reduced thickness which makes it easier for a robot to position the gasket on the support receiving it.

7. A sealing gasket according to claim 1, in which the fixing portion includes bearing portions situated substantially on either side of the adhesive in order to limit the deformation of the gasket in a corner of small radius of curvature of the support receiving the gasket.

8. A sealing gasket according to claim 1, in which the fixing portion of the gasket presents at least one thread or reinforcement for providing assistance in assembly by limiting the extent to which it can be lengthened while it is being put into place.

9. A sealing gasket according to claim 1, in which means are provided for weakening the compressibility forces of a gasket.

10. A sealing gasket according to claim 9, in which said means are constituted by at least one hinge-forming line of weakness formed in the elastically-deformable portion of the gasket.

11. A sealing gasket according to claim 1, in which the gasket is suitable for bearing laterally against its support so as to encourage holding of its elastically-deformable gasket.

12. A sealing gasket according to claim 1, in which the gasket is stored and supplied to an assembly line on a drum, a pallet, or a container of great length.

* * * * *